W. H. McCORMACK.
PROTECTING PAD OR SHIELD.
APPLICATION FILED OCT. 5, 1908.

961,309.

Patented June 14, 1910.

WITNESSES.

INVENTOR.
William H. McCormack
By Benedict, Morsell & Caldwell
ATTORNEYS.

UNITED STATES PATENT OFFICE.

WILLIAM H. McCORMACK, OF WEST ALLIS, WISCONSIN.

PROTECTING PAD OR SHIELD.

961,309. Specification of Letters Patent. Patented June 14, 1910.

Application filed October 5, 1908. Serial No. 456,133.

*To all whom it may concern:*

Be it known that I, WILLIAM H. McCORMACK, residing in West Allis, in the county of Milwaukee and State of Wisconsin, have invented new and useful Improvements in Protecting Pads or Shields, of which the following is a description, reference being had to the accompanying drawings, which are a part of this specification.

My invention has relation to improvements in protecting pads or shields, especially intended for adjustment to animals, particularly horses.

Heretofore no efficient and entirely satisfactory protecting pad has been devised, and the primary object of my invention, therefore, is to provide a form of pad which will absolutely protect a sore spot, and prevent irritation thereof due to one portion of the animal coming in contact with or striking or rubbing the affected part.

With the above primary object, and other incidental objects, in view, the invention consists of the devices and parts, or their equivalents, as hereinafter set forth.

Figure 1:
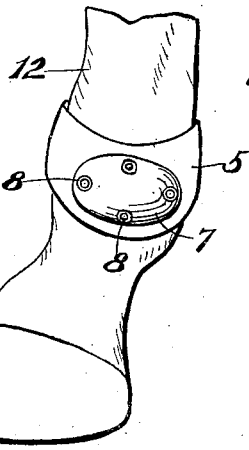
Figure 2:
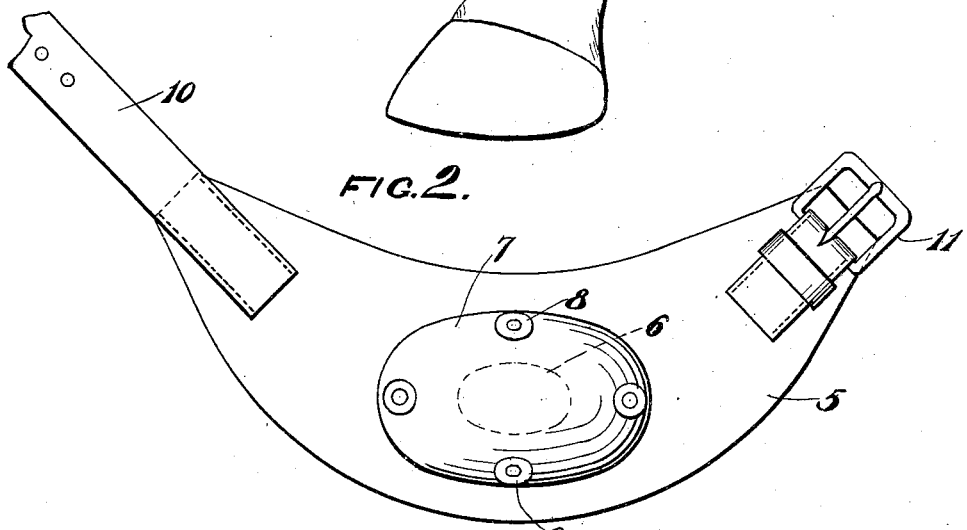
Figure 3:
Figure 4:
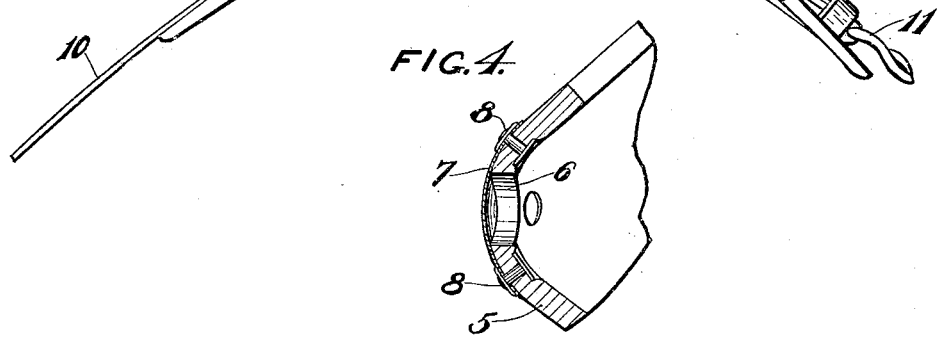

In the accompanying drawing, Figure 1 shows my improved pad applied to the lower portion of the leg of a horse, or around the fetlock joint of the leg; Fig. 2 is a detail view of the pad; Fig. 3 is a longitudinal sectional view of Fig. 2; and Fig. 4 is a transverse central sectional view.

Referring to the drawing, the numeral 5 indicates the main body portion of the pad, of any desired form, but preferably of the shield-like form shown, and composed of felt, or other soft and yielding material. At a central point, or approximately at a central point, the pad is provided with an opening 6.

Covering the opening, on the outside of the pad, is a plate 7 preferably of arched or spoon-like form, with the convexity outermost, and composed either of metal, or any other desirable hard substance capable of resisting a rubbing action or blow, such for instance as hard rubber, and the like. The plate may be secured to the pad by any desirable means, and I have shown in the drawing a securing means consisting of rivets 8 forced through the plate and through the main body portion of the pad or shield.

I prefer that one end of the plate be raised or convexed slightly greater than the other portions thereof, as indicated by the numeral 9, and as clearly shown in Fig. 3. The rubbing or blow is usually directed first against this particular end, and by raising or increasing slightly the convexity at this point, the blow or rubbing action is deflected.

The main or body portion of the pad may be secured around the affected part by any desirable means. In the drawing I have shown for the purpose an apertured strap 10 secured to one end of the pad or shield and extending therefrom, and a buckle 11 secured to the opposite end of the strap.

The drawing illustrates the invention applied to the leg 12 of a horse just above the hoof, and surrounding the portion of the leg termed the "fetlock joint". In the case of horses this is the particular part of the leg where soreness or irritation usually arises by reason of the rubbing or knocking together of these particular parts of the animal, especially when the animal is traveling. It will be understood, however, that my device may be applied to other portions of the legs, as, for instance, around the tendon of the extensor, or around the tendon of the superficial flexor, or in fact it may be applied at any portion of the anatomy of a horse or other animal which may be affected. The device is so applied that the sore or irritated spot is received in the opening 6, and in view of the fact that the plate 7 arches over this opening, there is no contact of said plate with the sore spot, and there can be no contact even when the other limb of the animal strikes the plate, owing to the stiff or unyielding nature of said plate.

From the foregoing description, it will be seen that I provide a most simple and efficient device which will thoroughly protect the animal, and afford the sore spot an opportunity to heal, in view of the fact that said spot is thoroughly protected against rubbing or a blow thereagainst.

What I claim as my invention is:

In a protecting pad or shield, the combination with a main or body portion provided with an opening for the accommodation of the sore or affected part, of a plate of arched or spoon-like form secured to the outside of the main or body portion, and bridging over the opening of said main or body portion, the convexity of the plate being outermost, and said convexity at one end of the plate being greater than at other points thereof, the plate being composed of a material of greater rigidity or stiffness than the material of the main or body portion.

In testimony whereof, I affix my signature, in presence of two witnesses.

WILLIAM H. McCORMACK.

Witnesses:
A. L. MORSELL,
ANNA F. SCHMIDTBAUER.